Aug. 27, 1968  J. BRANÝ  3,398,592
ARRANGEMENT FOR THE CONTROL OF THE MOVEMENT OF BALLS
Filed Oct. 21, 1965  7 Sheets-Sheet 1
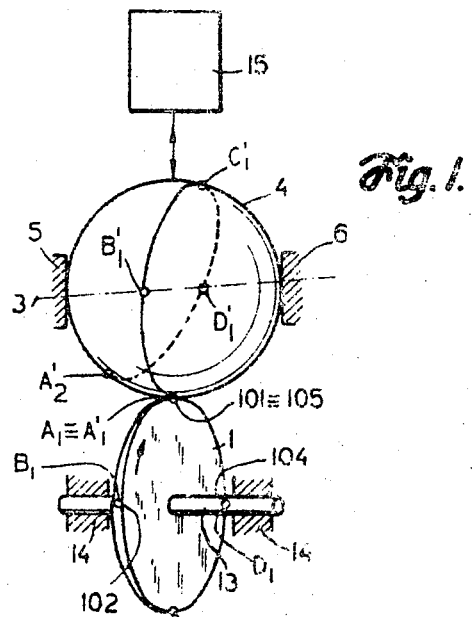
Fig. 1.
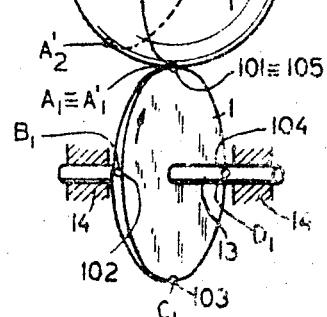
Fig. 2a.   Fig. 2b.   Fig. 2c.
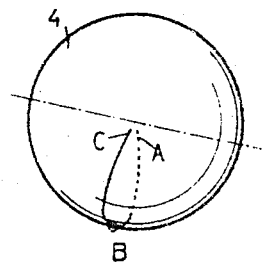   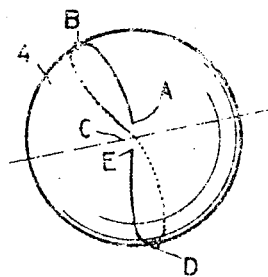   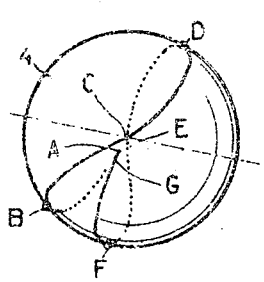
Fig. 2d.   Fig. 2e.   Fig. 2f.
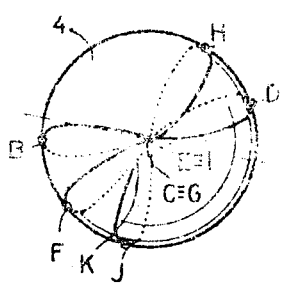   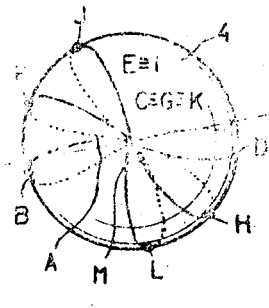
INVENTOR.
Jaroslav Brany
BY
Richard Low
Agt.

INVENTOR.
Jaroslav Brany

Aug. 27, 1968 J. BRANÝ 3,398,592
ARRANGEMENT FOR THE CONTROL OF THE MOVEMENT OF BALLS
Filed Oct. 21, 1965 7 Sheets-Sheet 3

INVENTOR.
Jaroslav Brany
BY Richard Low

Aug. 27, 1968    J. BRANÝ    3,398,592
ARRANGEMENT FOR THE CONTROL OF THE MOVEMENT OF BALLS
Filed Oct. 21, 1965    7 Sheets-Sheet 4

INVENTOR.
Jaroslav Brany
BY
Ag't

INVENTOR.
Jaroslav Brany
BY

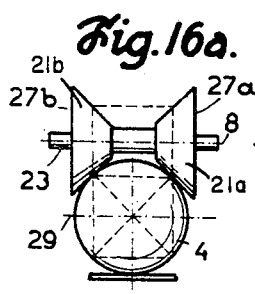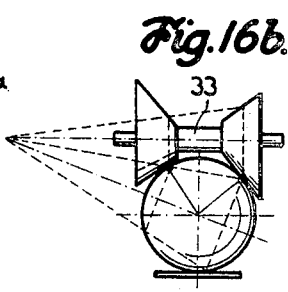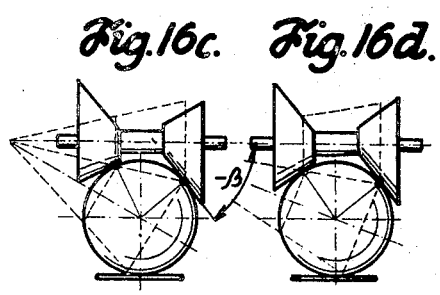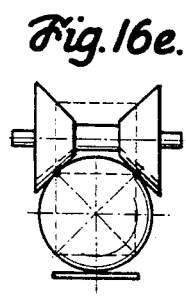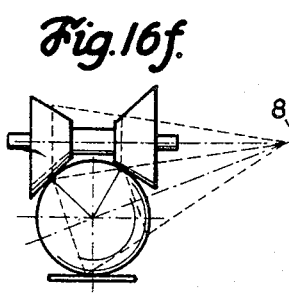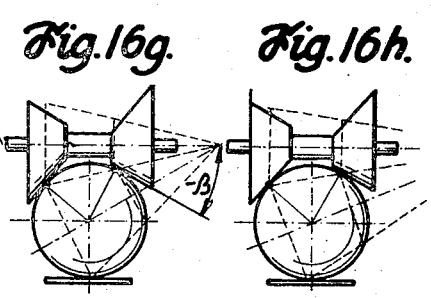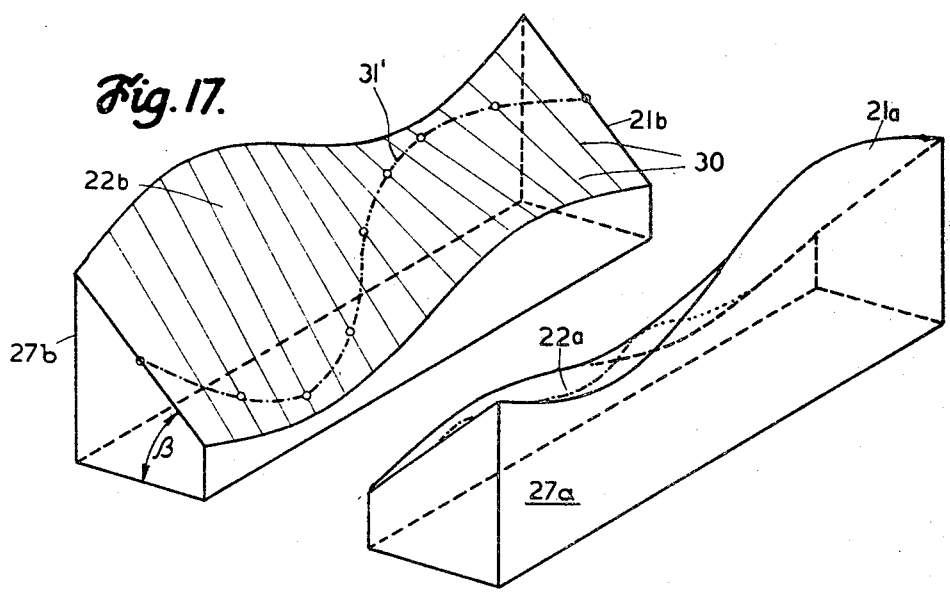

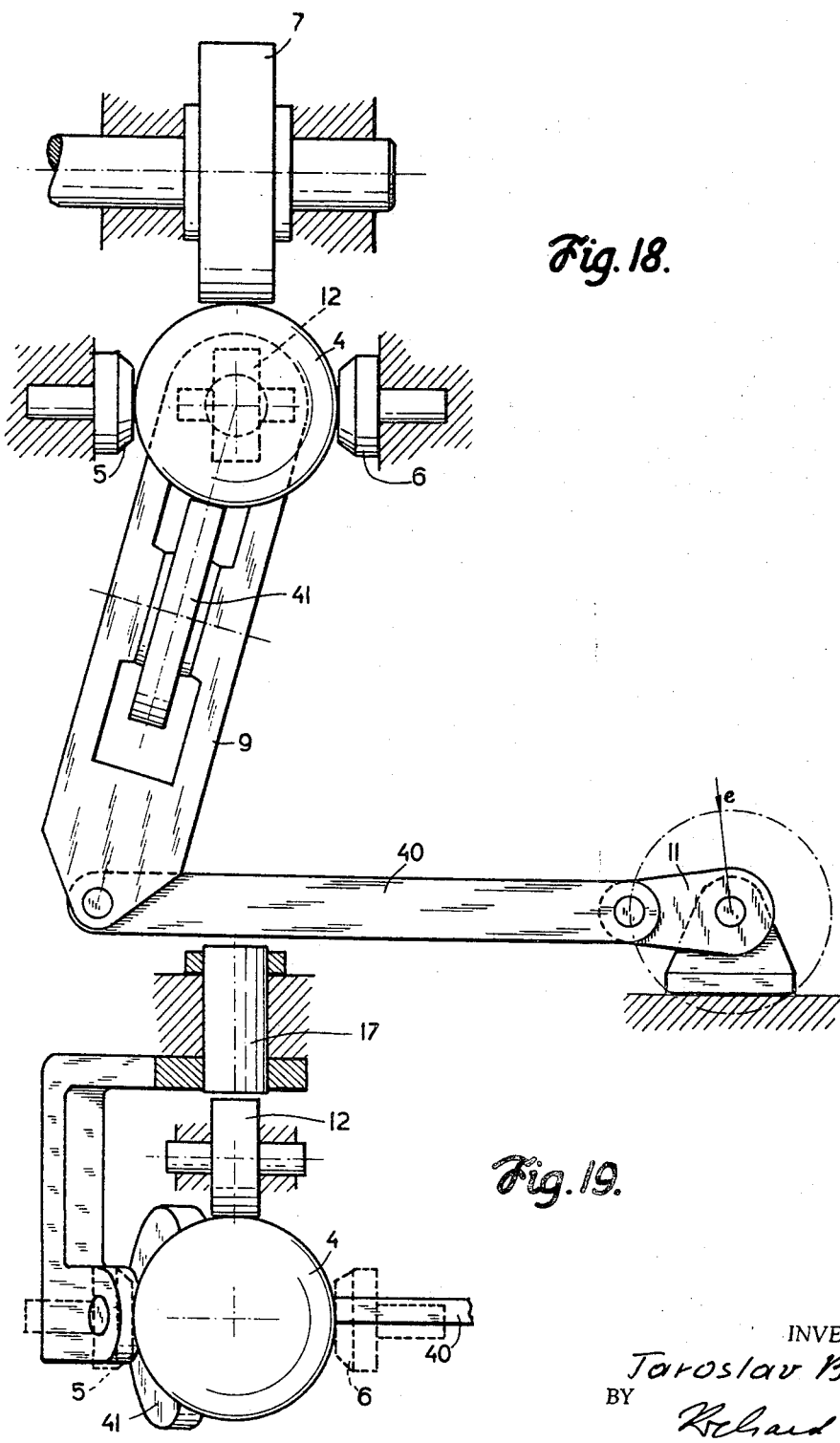

United States Patent Office 3,398,592
Patented Aug. 27, 1968

3,398,592
ARRANGEMENT FOR THE CONTROL OF
THE MOVEMENT OF BALLS
Jaroslav Brany, Prague, Czechoslovakia, assignor to
Vyzkumny ustav strojirenske technologie a ekonomiky,
Prague, Czechoslovakia
Filed Oct. 21, 1965, Ser. No. 499,802
Claims priority, application Czechoslovakia,
Dec. 1, 1964, 6,701/64
10 Claims. (Cl. 74—198)

ABSTRACT OF THE DISCLOSURE

In an apparatus for inspecting bearing balls, the ball is engaged at least at four surface points by holding elements which include a driving roller and a control roller. The annular contact face of the latter about its axis of rotation is shaped so that the point of contact between the ball and roller is shifted back annd forth in a circular arc in a plane defined by the roller axis and the ball center whereby all surface points of the ball pass an inspection device when the ball is turned by the driving roller.

---

This invention relates to an arrangement for rolling balls, particularly balls for ball bearings, for inspection of their surface or shape in such a manner that all points of the ball surface sequentially pass an inspection device. This can be accomplished when the inspected points on the ball surface form a pattern of meridians during rotation of the ball.

In known methods for rotating balls, the ball is rolled between two conical driving elements which, in addition to a basic rotary movement about a common axis, also move relative to each other.

When the known method is applied to balls of relatively large diameter requiring a great number of meridians, it is impossible even in precisely built devices adequately to inspect areas at the poles of the meridian pattern.

The invention, in one of its aspects, resides in an apparatus for rolling a ball which comprises holding means for holding a spherical body in a fixed position of the center thereof. The holding means include several elements whose contact faces are simultaneously engageable with four spaced points of the surface of the spherical body. At least two of the holding elements are rotatable about respective fixed axes while their contact faces engage the surface points of the spherical body. The contact face of one of these two elements is annular about the corresponding axis and is secured against axial movement. The last mentioned contact face is shaped in such a manner that spaced contact points thereof sequentially engage the surface of the spherical body, the contact points when engaging the surface, being located at respective spaced points of a circular arc which is defined by the intersection of the spherical surface with a plane of reference defined by the axis of rotation of the last-mentioned element, and by the center of the spherical body.

One of the rotatable elements is rotated about its axis by drive means, and thereby turns the spherical body while engaging the same.

As will presently become apparent, such an arrangement causes every surface portion of the ball to move past an inspection station while the ball is being turned by the driving roller.

The exact nature of this invention as well as other features and advantages thereof will be readily apparent from consideration of the following specification relating to the annexed drawing in which:

FIG. 1 illustrates elements of a ball inspecting arrangement of the invention and the inspected ball in a partly sectional elevational view;

FIGS. 2a to 2f illustrate six consecutive stages of the scanning pattern of meridians on the ball of FIG. 1 as it forms during operation of the apparatus of FIG. 1;

Figure 3:
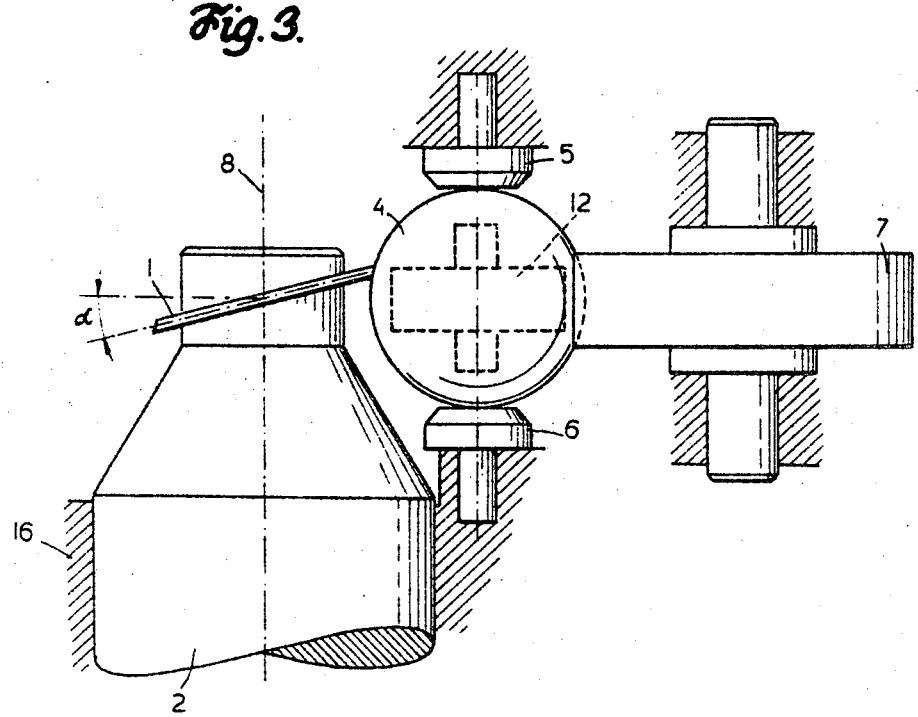
FIG. 3 is a more complete plan view of the apparatus of FIG. 1, partly in section.
Figure 4:
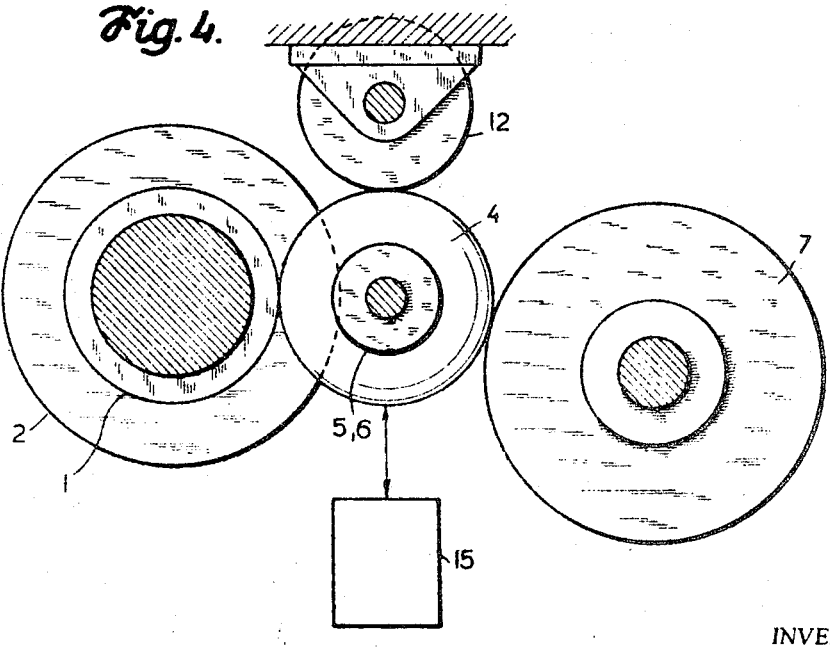
FIG. 4 shows the apparatus of FIG. 3 in elevation.
Figure 5:
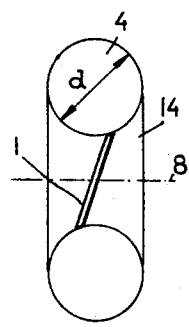
Figure 6:
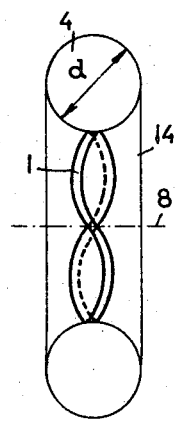
Figure 7:
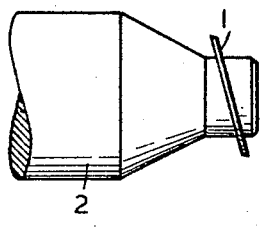
Figure 8:
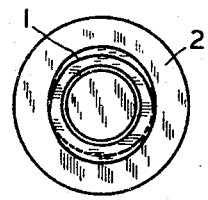
Figure 9:
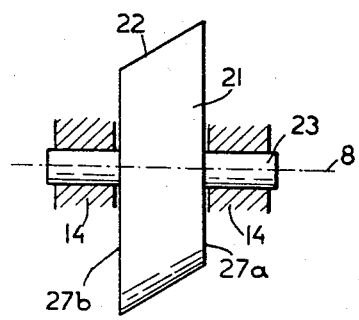
Figure 10:
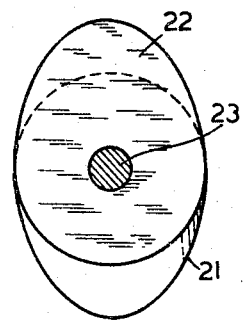
Figure 11:
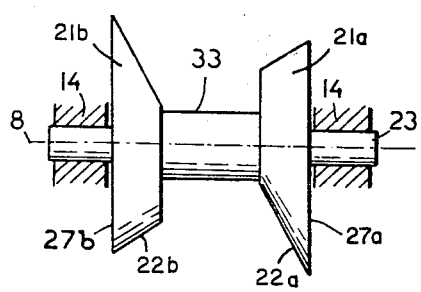
Figure 12:
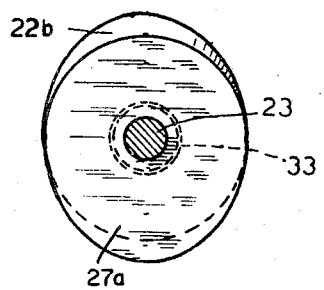
Figure 13:
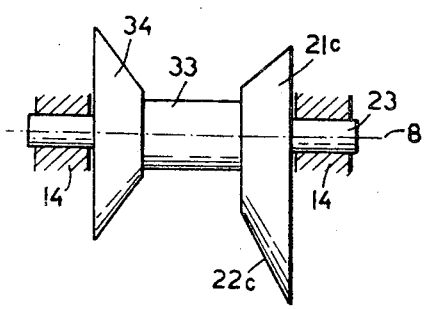
Figure 15:
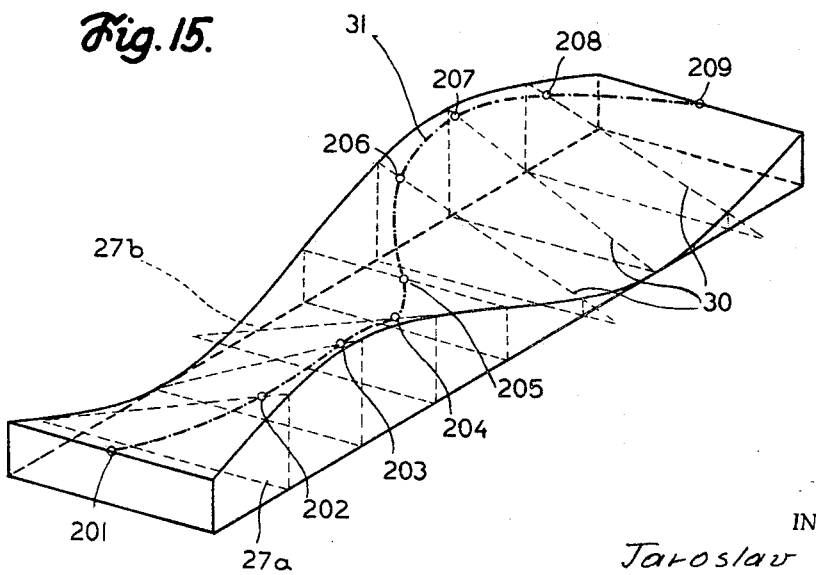

FIG. 5 diagrammatically illustrates geometrical relationships explaining the circumferential configuration of a control roller of the apparatus of FIGS. 1 to 4;

FIG. 6 shows a modified configuration of the roller of FIG. 5 in a corresponding view;

FIG. 7 shows the roller of FIG. 5 in a view corresponding to FIG. 3, but on a smaller scale;

FIG. 8 illustrates the roller of FIG. 7 in a view corresponding to FIG. 4;

FIG. 9 shows a modified roller for use in the apparatus of FIGS. 1 to 4 in plan view;

FIG. 10 illustrates the roller of FIG. 9 in elevation;

FIGS. 11 and 12 show another modified roller in views respectively corresponding to FIGS. 9 and 10;

FIG. 13 illustrates a further modification of the roller of FIG. 11;

FIGS. 14a to 14h illustrate consecutive operative positions of the apparatus of FIG. 3 modified to include the control roller of FIG. 9;

FIG. 15 is a perspective developed view of the circumference of the roller of FIG. 9;

FIGS. 16a to 16h show the apparatus of FIG. 3 modified to include the control roller of FIG. 11 in views corresponding to FIGS. 14a to 14h;

FIG. 17 is a developed view of two circumferential surfaces of the roller of FIG. 11 in the manner of FIG. 15;

FIG. 18 shows another inspection arrangement of the invention in partly sectional plan view; and FIG. 19 illustrates the arrangement of FIG. 18 in elevation and partly in section.

Referring initially to FIG. 1, there is seen a ball 4 which is being rolled for inspection of its surface in such a manner that its center remains in a fixed location. It is being engaged by a control roller 1 fixedly mounted on a shaft 13 which is journaled in bearings 14. The ball is secured against movement in the direction of the axis of rotation of the roller 1 by stationary supporting elements 5, 6.

The roller 1 is a flat disc obliquely inclined relative to its axis of rotation so that, in the position of the disc shown in FIG. 1, the element 101 of its circumference which is in contact with the ball 4 is radially aligned with the center of the disc, the element 102 which is angularly offset 90° from element 101 is axially offset from the latter toward the left, as viewed in FIG. 1. Element 103 which is spaced 90° from element 102 is diametrically opposite element 101 whereas the element 104, offset 90° from element 103 is axially offset toward the right. The circumference of the roller 1 swings axially back from element 104 to an element 105 which coincides with element 101. During operation of the apparatus, the ball 4 is turned, as will presently become apparent, and the roller 1 is frictionally driven by the ball in the direction of the arrow so that elements 101 to 105 sequentially make contact with the ball.

Because of the friction between the ball 4 and the control roller 1, the axis of rotation 3 of the ball is always perpendicular to a radius of the ball passing through the point of contact. As the point of contact shifts along the axis of the shaft 13 during operation of the device, the axis 3 is cyclically tilted. The points $A_1$, $B_1$, $C_1$, $D_1$ on the circumference of the roller 1, which are spaced 90° apart, sequentially engage the points $A_1'$, $B_1'$, $C_1'$, $D_1'$ $A_2'$ on the surface of the ball 4. The pionts $A_1'$ and $A_2'$ are located in a common plane through the center of the ball 4, but are angularly offset because the dimensions of the ball 4 and of the control roller 1 in the apparatus of FIG. 1 are selected in such a manner that one revolution of one corresponds to one revolution of the other.

As rotation of the ball 4 and of the control roller 1 continues, the point of contact at the completion of each revolution moves in a circle centered in the center of the ball 4. An inspection device 15 fixedly located in the apparatus is directed toward a point of the ball surface. During rolling movement of the ball, the inspected point defines a scanning pattern of meridians on the ball 4. The development of the pattern in six successive half turns of the ball 4 is illustrated in FIGS. 2a to 2f. The scanning point of the inspection device 15 moves sequentially from the point A on the ball surface, corresponding to engagement between the points $A_1$ and $A_1'$ on the roller 1 and the ball 4 respectively, to a point B, corresponding to engagement between the afore-mentioned points $B_1$ and $B_1'$, and further in an analogous manner to points C to M. All meridians of the pattern formed by the inspected surface point intersect each other, the point O of intersection being indicated in FIG. 2d.

The contact points between the control roller 1 and the ball 4 define substantially a sine curve, and so does the scanning curve which connects the points A to M and consists of the several meridians. The spacing of the meridians along the equator of the ball 4 is a function of the angle of inclination between the circumference of the roller 1 and a plane perpendicular to the axis of the shaft 13.

As is seen in the more complete illustration of the inspection arrangement of FIGS. 3 and 4, the fixed position of the center of the ball 4 is maintained by at least one of the two supporting elements 5, 6, by a cylindrical driving roller 7, a supporting roller 12, and the control roller 1. The supporting elements 5, 6 are stationary discs, but may be replaced by rollers. The three supporting elements 5, 6, 12 may be replaced by only two discs and/or rollers if the ball engaging faces of the elements are suitably inclined relative to each other.

The annular circumferential surface of the control roller 1 is a narrow section of the internal surface of an anchor ring or torus 14a which is formed when the ball 4 of diameter $d$ is moved in a circle about the axis 8 of rotation of the control roller as is shown in FIG. 5, the diameter of the circle being greater than the diameter $d$. The section is taken in parallel planes obliquely to the axis 8 which is also the axis of symmetry of the torus. The developed circumference of the section is formed by a curve which is substantially a sine curve.

When balls of a diameter greater than ⅜″ are to be tested in the apparatus of FIG. 3, it is advantageous to use a control roller 1′ whose circumference is a section of an internal anchor ring surface and defined in a developed view by two or more sine curves. This is shown in FIG. 6 in which the section is taken along an S-shaped arc.

The diameter of the anchor ring 14a is chosen in such a manner that the control roller rotates once during each revolution of the inspected ball, or once during two or more revolutions of the ball. The first-mentioned arrangement is preferred for relatively large balls, the second arrangement for relatively small balls, that is, balls having a diameter of than ⅜″.

As is seen in FIGS. 3, 4, 7, and 8, the disc-shaped control roller 1 is fixedly mounted on a head 2 journaled in bearings 16. The head 2 with the roller 1 may be replaced as needed for the testing of balls of different diameter. The control roller 1 exerts pressure on the ball 4 in a direction toward the supporting elements and the driving roller 7, but other elements may provide the necessary contact pressure.

The afore-described apparatus is operated as follows:

The driving roller 7 is started by means of a non-illustrated electric motor. The initial spacing of the control roller 1 and the driving roller 7 is slightly greater than the diameter of the ball 4. The stationary supporting elements 5, 6, and the supporting roller 12 are always in their operating positions. The ball 4 to be inspected is dropped from a non-illustrated hopper between the elements 5, 6, and the control roller 1 is thereafter moved toward the ball 4 to engage the same under sufficient pressure so that the moment of rotation due to friction exceeds the gyroscopic moment of the rotating ball.

The precession movement of the ball 4, that is, the shifting of the meridians in the scanning pattern of the inspection device 15, is a function of the angle $\alpha$ (FIG. 3) between the flat walls of the roller 1 and a plane perpendicular to the axis of rotation 8 of the roller. The number of the meridians is inversely related to the magnitude of the angle $\alpha$.

FIGS. 9 and 10 show a control roller 21 which has flat, parallel side walls 27a, 27b perpendicular to the axis of rotation 8 of the roller 21 which may replace the roller 1 in the apparatus of FIGS. 3 and 4. The annular contact face 22 of the roller 21, which is mounted in axially fixed position on a shaft 23 between bearings, 14 maintains rolling contact with the ball 4 during operation of the inspection arrangement as shown in FIGS. 14a to 14h which illustrate sequential positions of the control roller 21 offset relative to each other by angles of 45°. The ball is held between supporting elements 25, 26.

The points of contact between the ball 4 and the roller 21 are located in a reference plane defined by the axis of rotation 8 of the roller 21 and the center 35 of the ball 4, the plane intersecting the ball surface in a circle 32, and the contact face 22 in a family of straight generating lines 30 which are tangential to the circle 32 at the points of contact 201 to 209 shown in FIGS. 14a to 14h respectively, and intersect the axis 8 at angles $\beta$. Theoretically, the angle $\beta$ may vary in magnitude between −90° and +90°. Actually, the values of $\beta$ are limited to values between +60° and −60°. The contact face 22 is preferably shaped in such a manner that the magnitude of the angle $\beta$ changes about the circumference of the roller 21 along a sine curve.

The point of contact between the ball 4 and the roller 21 moves during each revolution of the roller 21 along an arc of the circle 32 which is bounded by the points of intersection of the circle with the planes of the lateral roller walls 27a, 27b. The resulting limiting values of $\beta$ in the arrangement illustrated in FIGS. 14a to 14h are ±25°.

Figure 14A:
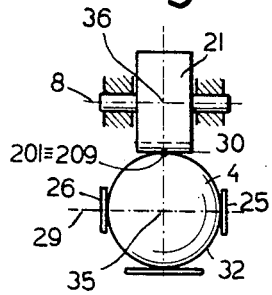
Figure 14B:
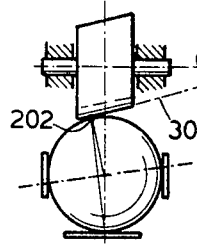
Figure 14C:
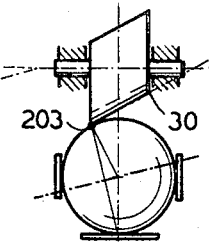
Figure 14D:
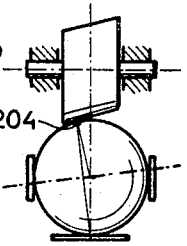
Figure 14E:
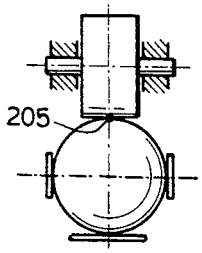
Figure 14F:
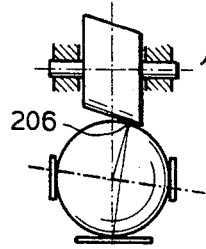
Figure 14G:
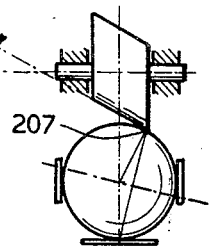
Figure 14H:
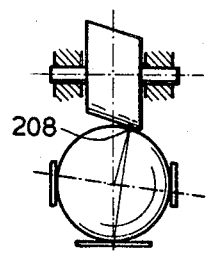

In the condition of the apparatus shown in FIG. 14a, the angle $\beta$ is zero, the centers 35, 36 of the ball 4 and of the roller 21 are aligned along a radial line through the point of contact 201, and the axes of rotation 29, 8 of the ball 4 and of the roller 21 are parallel. When the ball 4 and the control roller 21 rotate from the position of FIG. 14a, the angle $\beta$ increases to a maximum of +25° (FIG. 14c), then decreases to zero (FIG. 14e) and further to −25° (FIG. 14g), before the condition of FIG. 14a is restored upon completion of one revolution.

The change in the inclination of the generating lines 30 along the circumference of the roller 21 is also apparent from FIG. 15 which is a developed view of the circumference of the control roller.

The line 31 which connects the contact points 201 to 209 in the view of FIG. 15 is the contact line between the control roller 21 and the ball 4. It passes substantially in a sine shape from one lateral wall 27a of the control roller 21 to the other wall 27b.

The contact face 22, as is evident from FIG. 15, extends in two half waves around the circumference of the roller 21 so that the transmission ratio between the roller and the ball 4 is 1:1. The contact face of the roller 21 may contain any even number of half waves, the transmission ratio between the roller 21 and the ball 4 being 1:$n/2$, wherein $n$ is the number of half waves. The contact face 22 always causes a system of meridians with two poles to be generated in the manner more fully described with reference to FIGS. 2a to 2f, regardless of the magnitude of $n$.

The control function may also be performed by a twin roller of the type shown in FIGS. 11 and 12. The two elements 21a, 21b of the roller are axially fixedly connected by a cylindrical coaxial portion 33 of the shaft 23 which is journaled in bearings 14. The elements 21a, 21b have respective flat side walls 27a, 27b and taper axially toward each other from the side walls. The tapering annular faces 22a, 22b of the elements 21a, 21b are identical, but are offset 180° relative to the common axis of rotation of the elements 21a, 21b. Each annular face 22a, 22b is similar to the afore-described contact face 22 in being generated by a family of straight lines which intersect the axis 8 at varying angles $\beta$, as is best seen in FIGS. 16a to 16h which illustrate the cooperation of the twin rollers 21a, 21b with a ball 4 in the manner of FIG. 14a to 14h.

The values of $\beta$ for one of the illustrated elements 21a, 21b vary cyclically between +30° and +60°, and for the other element between −30° and −60°. The configurations of the contact faces 22a, 22b are apparent from the developed views of FIG. 17 which correspond to the afore-discussed FIG. 15. Each of the contact faces engages the ball 4 during rotation of the latter, and the contact points define substantially sinusoidal curves 31'.

FIG. 13 shows a twin control roller having one element 21c which is closely similar to one of the elements 21a, 21b has a correspondingly shaped annular contact face 22c. The second element 34 of the twin roller is a frustum of a cone tapering toward the element 21c at the apex angle of 90° and coaxial with the cylindrical shaft portion 33. The twin roller illustrated in FIG. 13 operates substantially as shown in FIGS. 16a to 16h with reference to the elements 21a, 21b.

As in the afore-described embodiments of the invention, the maximum tilting angle of the axis of rotation 29 of the ball 4 determines the spacing and number of the meridians in the scanning pattern on the ball surface. The greater the maximum inclination of the axis 29 from a position parallel to the axis 8, the smaller the number of meridians, and the greater their spacing. The maximum inclination of the axis 29, in turn, is determined by the variation in the magnitude of the angle $\beta$. The greater the difference between the maximum and minimum values of $\beta$, the smaller the number of meridians.

The twin roller shown in FIG. 13 has only one contact face 22c for which the angle of inclination $\beta$ is variable, and the maximum inclination of the axis 29 is equal to the maximum value of $\beta$.

It is an advantage of twin rollers that they provide two points of support for the ball 4, and the supporting elements 5, 6, 25, 26 are unnecessary, thereby avoiding points of significant friction.

Twin control rollers also may be employed for rolling balls varying widely in diameter, whereas a control roller having a single annular contact face must be specifically designed for each ball diameter.

Another embodiment of the invention is shown in FIGS. 18 and 19. As in the device of FIGS. 3 and 4, a ball 4 is held by supporting elements 5, 6, 12, and is caused to rotate by frictional engagement with a driven roller 7. A control roller 41 is rotatably fastened on a carrier arm 9 which is mounted for pivotal movement on a pin 17 whose axis passes through the center of the ball 4. The two ends of a connecting rod 40 are respectively hingedly attached to the free end of the arm 9 and to a crank 11 which is rotated in a manner not further illustrated.

The point of contact between the ball 4 and the roller 41, which is a flat cylindrical disc, thus is shifted in an oscillating motion about an axis through the center of the ball 4 while the ball 4 is being rotated by the driven roller 7.

The several control rollers of the invention described hereinabove are readily manufactured to precise tolerances. The inspection arrangement of the invention can be made sturdy without loss of precision so as to withstand stresses caused by defective balls. The mode of operation of the arrangement is determined solely by the shape of the control roller, and is practically independent from the characteristics of all other elements. The control rollers are subject to wear at a relatively low rate only.

While preferred embodiments of the invention have been described with reference to the inspection of ball bearing balls, this invention is concerned generally with the rolling of balls in a pattern of meridians, and the same control rollers and other elements may be employed in the same manner for the surface treatment or cleaning of balls.

I claim:

1. An apparatus for rolling a ball comprising, in combination:
   (a) holding means for holding a spherical body in a fixed position of the center thereof,
      (1) said holding means including a plurality of elements having respective contact faces simultaneously engageable with four spaced points on the surface of said body,
      (2) at least two of said elements being arranged for rotation about respective fixed axes while said contact faces thereof engage said surface points,
      (3) the contact face of a first one of said two elements being annular about the axis of rotation of said first element, and being secured against axial movement,
      (4) said contact face of said first element being shaped for sequential engagement of respective spaced contact points of said contact face with said surface of said body, said contact points, when engaging said surface, being located at respective spaced points of a circular arc defined by the intersection of said surface with a plane of reference defined by the axis of rotation of said first element and by said center; and
   (b) drive means for rotating one of said two elements about the axis thereof and for thereby turning said spherical body.

2. An apparatus as set forth in claim 1, wherein the contact face of said first element intersects said plane of reference in a straight line tangential to said circular arc in all angular positions of said first element during rotation thereof about the axis thereof.

3. An apparatus as set forth in claim 2, wherein said straight line intersects the axis of rotation of said first element at an angle not greater than 60°, said angle varying cyclically during rotation of said first element.

4. An apparatus as set forth in claim 2, wherein three of said elements are arranged for rotation about respective axes while said contact faces thereof engage said surface points, the axes of the third element coinciding with the axis of said first element, the contact face of said third element being identical in shape with the contact face of said first element, said third element being secured to said first element in a position in which the contact faces of said first and third elements oppositely face each other and are angularly offset 180° about the common axis.

5. An apparatus as set forth in claim 4, wherein the contact faces of said first element and of said third element axially taper toward each other.

6. An apparatus as set forth in claim 2, wherein three of said elements are arranged for rotation about respective axes while said contact faces thereof engage said surface points, the axes of the third element coinciding with the axis of said first element, the contact face of said third element being conical about the common axis, said third element being secured to said first element in a position in which the contact faces of said first and third elements oppositely face each other, said oppositely facing contact faces tapering axially toward each other.

7. An apparatus as set forth in claim 6, wherein said conical contact face has an apex angle of substantially 90°.

8. An apparatus as set forth in claim 1, wherein said contact face of said first contact element is an annular section of the internal surface of an anchor ring symmetrical about the axis of rotation of said one element, the section being taken obliquely relative to said axis of rotation.

9. An apparatus as set forth in claim 1, wherein said drive means rotate the second one of said two elements.

10. An apparatus for rolling a ball comprising, in combination:
(a) holding means for holding a spherical body in a fixed position of the center thereof,
   (1) said holding means including a plurality of elements having respective contact faces simultaneously engageable with four spaced points on the surface of said body,
(b) a carrier mounted for pivotal movement about an axis passing through said center;
(c) actuating means for oscillating said carrier about said axis,
   (1) one of said elements being arranged on said carrier for rotation about an axis fixed relative to said carrier while said carrier is being oscillated, and the contact face of said one element engages the surface of said body; and
(d) drive means for rotating another one of said elements about an axis thereof while the contact face of said other element engages said body, and for thereby turning said body.

References Cited

UNITED STATES PATENTS

| | | | |
|---|---|---|---|
| 2,727,396 | 12/1955 | Haugwitz | 74—198 |
| 3,267,755 | 8/1966 | Isely | 74—198 |
| 3,269,190 | 8/1966 | Laman | 74—198 |

FOREIGN PATENTS

| | | |
|---|---|---|
| 188,924 | 3/1957 | Austria. |
| 205,989 | 10/1939 | Switzerland. |

C. J. HUSAR, *Primary Examiner*.